US010626234B1

(12) United States Patent
Chiang et al.

(10) Patent No.: US 10,626,234 B1
(45) Date of Patent: Apr. 21, 2020

(54) METHOD FOR FABRICATING SOLID PHOTONIC CRYSTALS

(71) Applicant: NATIONAL SUN YAT-SEN UNIVERSITY, Kaohsiung (TW)

(72) Inventors: Yeo-Wan Chiang, Kaohsiung (TW); En-Li Lin, Kaohsiung (TW); Wei-Lun Hsu, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/199,386

(22) Filed: Nov. 26, 2018

(30) Foreign Application Priority Data

Oct. 22, 2018 (TW) .............................. 107137245 A

(51) Int. Cl.
G01J 3/46 (2006.01)
G02F 1/03 (2006.01)
(Continued)

(52) U.S. Cl.
CPC ............... C08J 5/18 (2013.01); B29C 41/003 (2013.01); C08J 3/093 (2013.01); C08J 3/11 (2013.01);
(Continued)

(58) Field of Classification Search
CPC .................... C08J 5/18; C08J 3/093
See application file for complete search history.

(56) References Cited

U.S. PATENT DOCUMENTS

2005/0158988 A1 7/2005 Lee et al.
2009/0086208 A1* 4/2009 Kang ..................... B82Y 20/00
356/402
(Continued)

FOREIGN PATENT DOCUMENTS

TW 200530278 A 9/2005
TW 200952072 A1 12/2009
TW 201102403 A1 1/2011

OTHER PUBLICATIONS

En-Li Lin et al., Trapping Structural Coloration by a Bioinspired Gyroid Microstructure in Solid State, ACS Nano 2018, 12, 485-493, Dec. 14, 2017.

(Continued)

Primary Examiner — Dah-Wei D. Yuan
Assistant Examiner — Kristen A Dagenais-Englehart
(74) Attorney, Agent, or Firm — Demian K. Jackson; Jackson IPG PLLC

(57) ABSTRACT

A method, i.e., trapping of structural coloration (TOSC), for fabricating solid 3D network-structured photonic crystals featuring tunable visible structural colorations includes the steps: a PS-PVP copolymer is dissolved in a chloride-containing solvent and is cast as an initial film, the copolymer self-assembles into 3D periodic network-structured morphology; the copolymer in the initial film is swollen in a polar solvent to form a solvated film; the solvated film is dried to form a solid photonic crystal. During evaporation of the polar solvent, the PVP blocks of the copolymer become glassy and form a thin glassy layer on the surface of the solvated film such that the 3D network structures of the copolymer in solvated state can be preserved into the solid photonic crystal revealing the similar periodicity and dimension to that in solvated state, which is very distinct from the film having 1D lamellar structure.

9 Claims, 7 Drawing Sheets

(51) Int. Cl.
  *C08J 5/18* (2006.01)
  *B29C 41/00* (2006.01)
  *C08J 3/11* (2006.01)
  *C08J 7/02* (2006.01)
  *C08J 3/09* (2006.01)
  *B29K 29/00* (2006.01)

(52) U.S. Cl.
  CPC ............ *C08J 7/02* (2013.01); *B29K 2029/00* (2013.01); *C08J 2353/00* (2013.01)

(56) References Cited

U.S. PATENT DOCUMENTS

2018/0067258 A1* 3/2018 Park .................. G02F 1/313
2018/0083190 A1* 3/2018 Oh .................... H01L 51/0003

OTHER PUBLICATIONS

En-Li Lin, Fabrications of Photonic Crystals with Various Microstructures in Polystyrene-block- Poly(2-vinylpyridine) Block Copolymer Thin Films, Master Thesis of National Sun Yat-sen University, Aug. 8, 2018.
Taiwanese Office Action dated Jul. 23, 2019 for Taiwanese Patent Application No. 107137245, 6 pages.

* cited by examiner

METHOD FOR FABRICATING SOLID PHOTONIC CRYSTALS

FIELD OF THE INVENTION

This invention generally relates to a method for fabricating photonic crystals, and more particularly to a method for fabricating solid photonic crystals.

BACKGROUND OF THE INVENTION

Numerous studies indicate that photonic crystals in butterfly wings exhibit advanced optical properties result of their highly interconnected gyroid microstructures, however, direct synthesizing artificial visible-wavelength polymeric photonic crystals is difficult.

In previous technology, one-dimensional lamellar amphiphilic block copolymers are usually used to fabricate photonic crystals. The lamellar amphiphilic block copolymer could be swollen by solvent to form a solvated photonic crystal exhibiting visible or near-infrared photonic bandgap. Nevertheless, the solvent evaporates in air continually and the solvated photonic crystal becomes solid. When the solvent evaporates completely, the photonic bandgap blue shifts to UV wavelength range. The lamellar photonic crystal loses structural colorations in the solid state so it is not applicable in solid-state optical apparatus used in air.

SUMMARY

The present invention provides a method for fabricating solid 3D photonic crystals having tunable structural colorations and photonic bandgaps in visible wavelength range. Photonic bandgaps and structural colorations in solvated film are preserved in solid photonic crystals by 3D network structures made by self-assembly of polystyrene-block-poly (vinylpyridine) copolymers.

The method for fabricating solid photonic crystals of the present invention includes the steps of preparing a copolymer solution by dissolving a polystyrene-block-polyvinylpyridine (PS-PVP) copolymer in a chloride-containing solvent; casting the copolymer solution on a substrate to form an initial film, the PS-PVP copolymer self-assembles into 3D periodic network structures in the initial film; swelling the initial film, the initial film is soaked in a polar solvent to swell the PS-PVP copolymer such that the initial film becomes a solvated film, wherein the periodicity of the 3D network structures in the solvated film is higher than that in the initial film; and drying the solvated film, the solvated film becomes a solid photonic crystal when the polar solvent is evaporated completely, wherein PVP blocks in the PS-PVP copolymer become glassy during evaporation of the polar solvent such that the periodicity of the 3D network structure in the solid photonic crystal is preserved between that in the initial film and the solvated film.

The periodicity of the 3D network structure in the initial film is too small to form visible or near-infrared photonic bandgap so the initial film is incapable of use in normal optical devices. For this reason, the polar solvent of the present invention is provided to swell the initial film and expand the periodicity of the 3D network structure. When the polar solvent evaporates completely, the microstructural periodicity of solid photonic crystal does not revert to the initial film and the periodicity of the 3D network structure in the solid photonic crystal is preserved between that in the initial film and the solvated film because the highly interconnectivity of the 3D network structure increases the evaporation rate of the polar solvent and leads PVP blocks become vitrified to form a thin glassy PVP layer on the solvated film when the concentration of the polar solvent is sufficiently low. Accordingly, the photonic bandgaps and structural colorations of the dried solid photonic crystal are in the range of visible wavelengths by adjusting the periodicity of the 3D network structures.

DETAILED DESCRIPTION OF THE INVENTION

Figure 1:
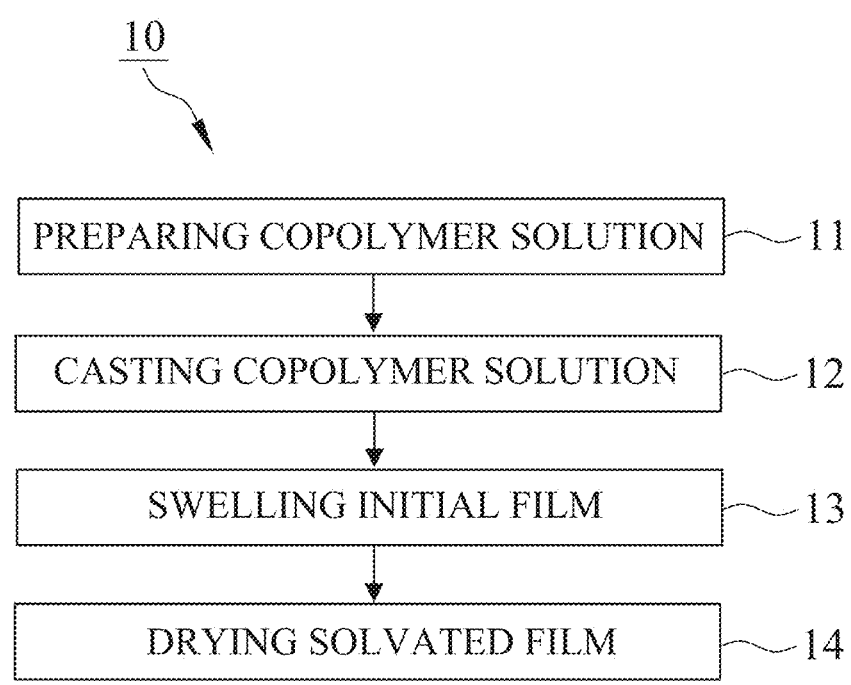
FIG. 1 is a flow chart illustrating a method for fabricating solid photonic crystals in accordance with one embodiment of the present invention.

With reference to FIG. 1, a method for fabricating solid photonic crystals 10 of the present invention includes step 11 of preparing copolymer solution, step 12 of casting copolymer solution, step 13 of swelling initial film and step 14 of drying solvated film.

With reference to FIG. 1, firstly, PS-PVP (polystyrene-block-poly(vinylpyridine)) copolymer is dissolved in a chloride-containing solvent to prepare a copolymer solution. The PS-PVP copolymer is an amphiphilic block copolymer composed of hydrophobic PS (polystyrene) blocks and hydrophilic PVP (poly(vinylpyridine)) blocks. Preferably, the PS-PVP copolymer has a molecular weight lower than 500 kg/mol and 58-67 vol % of PS blocks.

The PS-PVP copolymer may be PS-P2VP (polystyrene-block-poly(2-vinylpyridine)) copolymer or PS-P4VP (polystyrene-block-poly(4-vinylpyridine)) copolymer, and the chloride-containing solvent is a neutral solvent such as chloroform, 1,2-dichloroethane (DCE), 1,1,2-trichloroethane (TCE) and so on.

With reference to FIG. 1, the prepared copolymer solution is then cast on a substrate to form an initial film through spin casting, dip casting or slot casting preferably. The substrate may be made of glass, silicon, indium tin oxide (ITO) or polyethylene terephthalate (PET). In this embodiment, the copolymer solution is spin-cast onto a glass substrate at a rate between 700 rpm and 3000 rpm.

During casting, the PS-PVP copolymer self assembles into 3D network structures having a periodicity which may be gyroid microstructures, interconnected network microstructures or other 3D ordered network microstructures.

Figure 2:
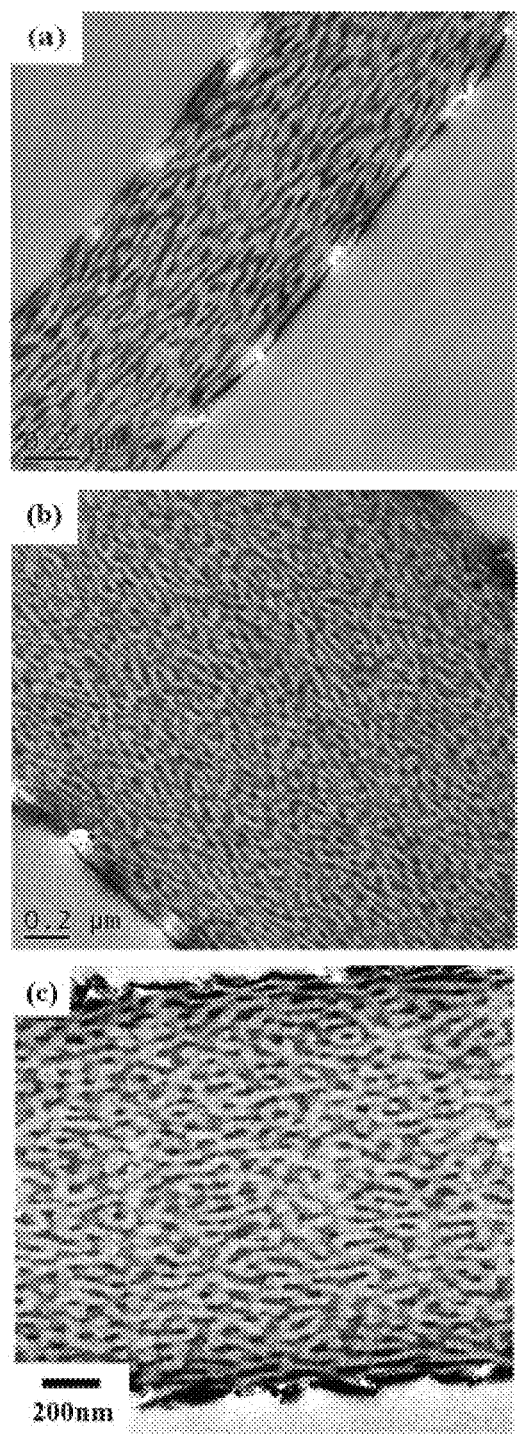
FIG. 2 is a TEM (transmission electron microscope) micrograph of PS-P2VP initial film.

FIG. 2 is a cross-sectional TEM (transmission electron microscope) micrograph displaying network microstructures in the initial film. In this study, PS-P2VP copolymers are dissolved in (a) chloroform, (b) DCE and (c) TCE respectively to form three different PS-P2VP solutions, and PS-P2VP initial films are cast from the PS-P2VP solutions. With $I_2$ vapor staining for 60 minutes, PS microdomains appear bright and P2VP microdomains appear dark in the TEM micrograph of the stained PS-P2VP initial films. As shown in TEM micrographs, PS-P2VP copolymers in the initial films from different chloride-containing solvents all self-assemble into gyroid network microstructures. With reference to FIG. 2(c), the 3D network structures in the PS-P2VP initial film from TCE has a periodicity of about 247 nm corresponding to non-visible wavelengths, as a result, the PS-P2VP initial film is colorless hue.

Figure 3:
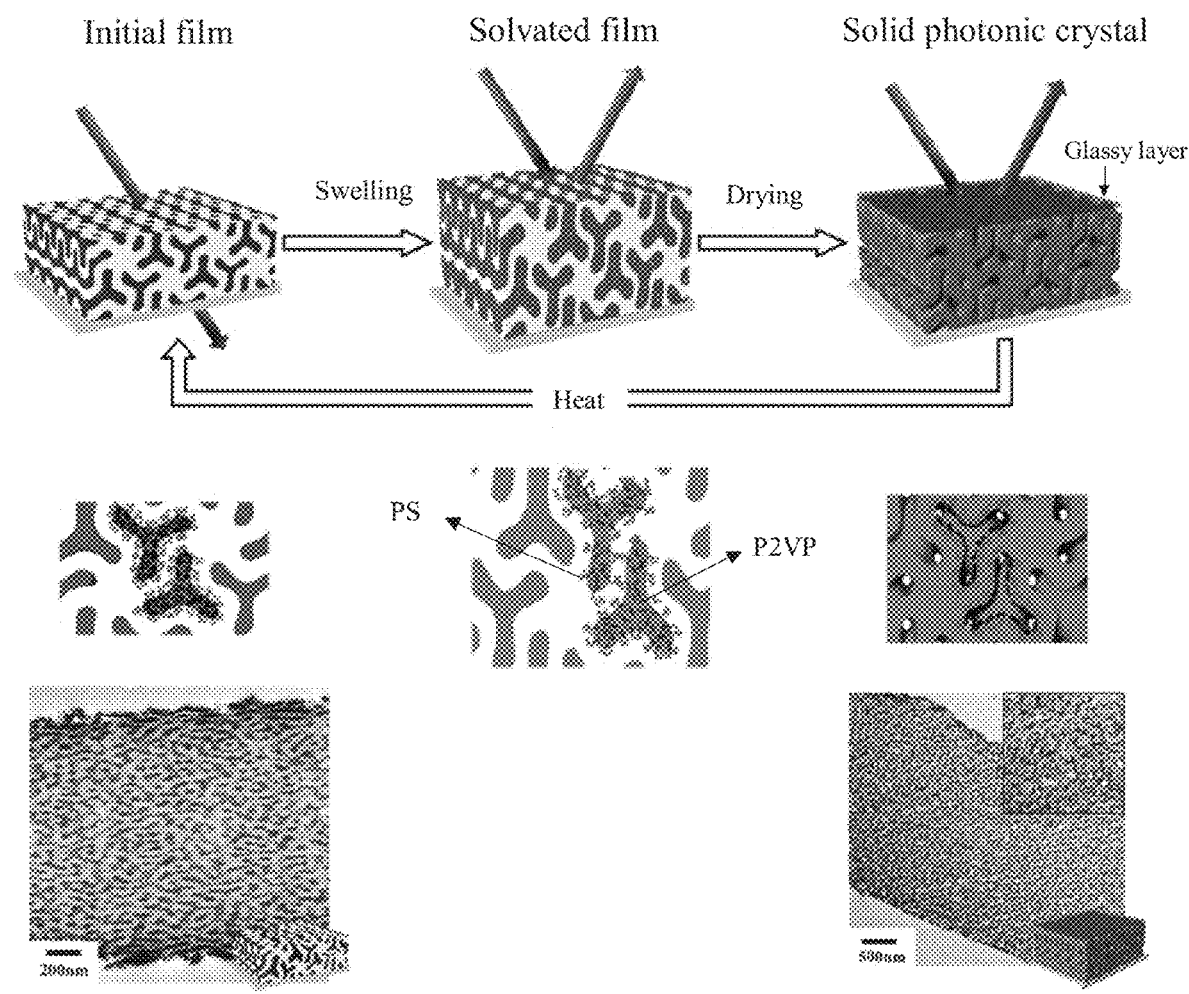
FIG. 3 is a diagram illustrating the method for fabricating solid photonic crystals in accordance with one embodiment of the present invention.

With reference to FIGS. 1 and 3, next, the obtained initial film is soaked and swollen in a polar solvent. The polar solvent is utilized to swell the PVP chains in the PS-PVP copolymer so as to lead the initial film becoming a solvated film. The periodicity of the 3D network structures in the solvated film is higher than that in the initial film due to stretching of PVP chains by swelling. Preferably, the solvated film has a thickness between 1 µm and 10 µm, and the polar solvent is alcohol such as methanol, ethanol, 2-propanol and so on.

In this study, the PS-P2VP initial film is soaked in ethanol for 10 minutes to become a PS-P2VP solvated film result of swollen P2VP chains. The periodicity of the 3D network structures in the PS-P2VP solvated film is increased to correspond red light wavelengths. In other words, the PS-P2VP solvated film exhibits red structural coloration due to its photonic bandgap corresponding to red light wavelengths.

With reference to FIGS. 1 and 3, finally, the solvated film is taken out from the polar solvent to be dried. The solvated film thus becomes a solid 3D photonic crystal when the polar solvent in the solvated film is completely evaporated. Preferably, the solvated film is dried at a temperature ranging from 0° C. to 50° C.

In contrast to the system having lamellar microstructures, the evaporation of the polar solvent is increased significantly in the film featuring the 3D network structures. When the polar solvent concentration is sufficiently low during film drying, the solvated PVP chains reach their glass transition temperature ($T_g$) and thus become glassy. For this reason, the PVP chains in the solvated film become glassy from surface to interior and simultaneously form a thin glassy PVP layer covering onto the solvated film surface (as shown in FIG. 3). The thin glassy layer on the film surface can trap the periodicity of the expanded 3D network structures of the solvated film until complete drying such that the periodicity of the 3D network structures in the dried solid photonic crystal is preserved between that in the initial film and the solvated film. This indicates that the periodicity will not be decreased or reverted back to that in the initial film.

In this study, the PS-P2VP solvated film is dried at room temperature. When the ethanol is evaporated from the PS-P2VP solvated film completely, the PS-P2VP solvated film becomes a PS-P2VP solid photonic crystal having a thickness of about 2.9 µm. The periodicity of the 3D network structures in the PS-P2VP solid photonic crystal is approximately 448 nm which could result in green structural coloration. Consequently, the dried PS-P2VP film exhibits visible structural coloration in solid state and the solid photonic crystal fabricated by the method of the present invention is able to be applied in optoelectronic devices which operate in atmosphere.

The PS-P2VP solid photonic crystal has thicker film thickness and higher periodicity of the 3D network structures than the PS-P2VP initial film, due to the immobilization of the 3D network structures in the solid state caused by the interior glassy P2VP chains and thin glassy P2VP layer on the film surface. Consequently, the photonic bandgaps and structural colorations in the solvated state are preserved in the solid photonic crystal of the present invention through a physical approach, namely, trapping of structural coloration (TOSC).

Figure 4:
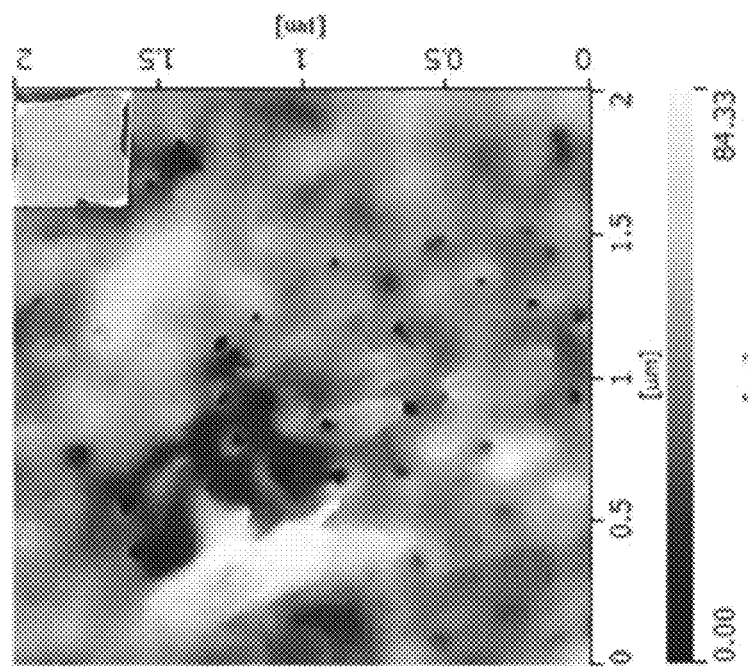
FIG. 4 is a SPM (scanning probe microscope) surface image of PS-P2VP initial film.
Figure 5:
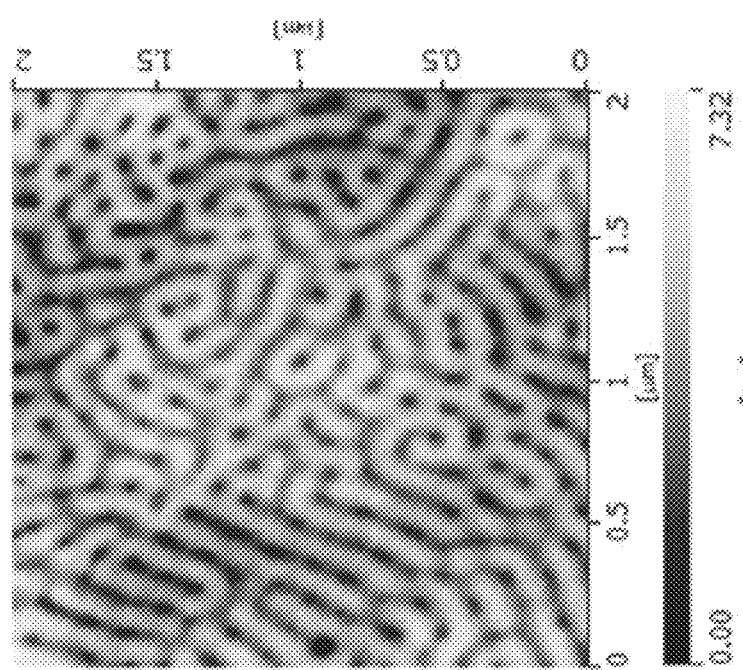
FIG. 5 is a SPM (scanning probe microscope) surface image of PS-P2VP solid photonic crystal.

FIGS. 4 and 5 are SPM (scanning probe microscope) surface images of the PS-P2VP initial film and the PS-P2VP solid photonic crystal thin film after TOSC treatment, respectively. The featureless surface of the TOSC-featured PS-P2VP solid film (FIG. 5) is different from the gyroid morphology on the surface of the PS-P2VP initial film (FIG. 4). The difference verifies the presence of the glassy P2VP chains, capable of preserve the photonic bandgaps and structural colorations in the solvated state, on the surface of the PS-P2VP solid photonic crystal.

Figure 6:
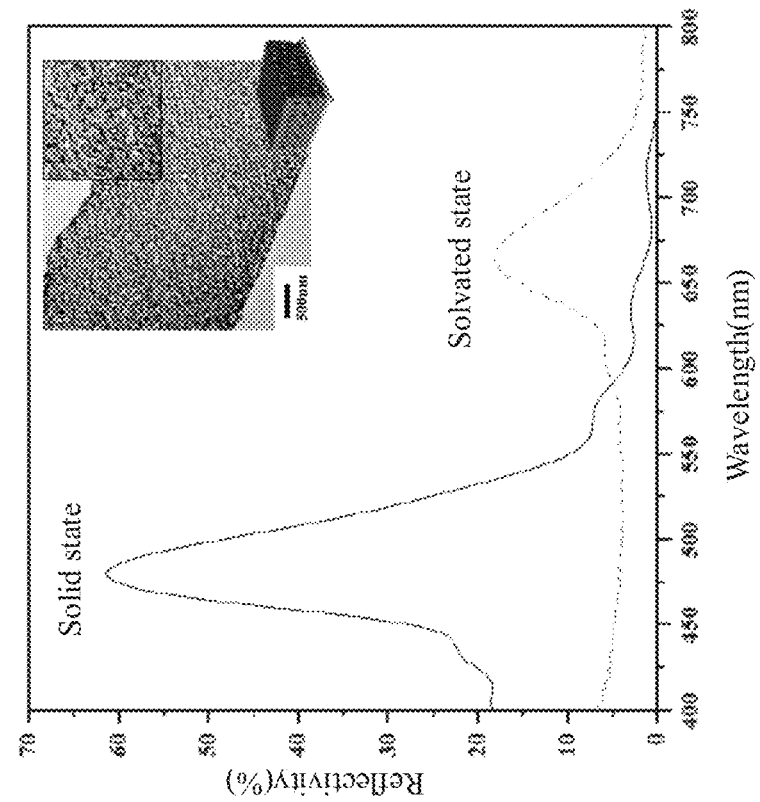
FIG. 6 is a reflectivity spectra of PS-P2VP film having 3D network microstructures.

FIG. 6 is the reflectivity spectra of the 3D network-structured PS-P2VP solvated film (dashed line) and the 3D network-structured PS-P2VP solid photonic crystal (solid line). The 3D network-structured PS-P2VP solvated film exhibits a red reflectance peak at 664 nm and has reflectivity of approximately 16%, and the 3D network-structured PS-P2VP solid photonic crystal exhibits a green reflectance peak at 481 nm and has a strong reflectivity of about 60%. This result verifies that the 3D network-structured PS-P2VP in the solid state displays a visible structural coloration accompanied by higher reflectivity after the polar solvent has been evaporated completely.

In order to identify the effect of the self-assembly microstructures of the copolymer on trapping structural coloration, the PS-P2VP initial film is exposed to chloroform/ethanol vapor for solvent annealing (50° C. for 3 hours) and transits from 3D network to 1D lamella. Then the PS-P2VP initial film having 1D lamellar microstructures is soaked in ethanol for swelling and dried to remove ethanol completely.

Figure 7:
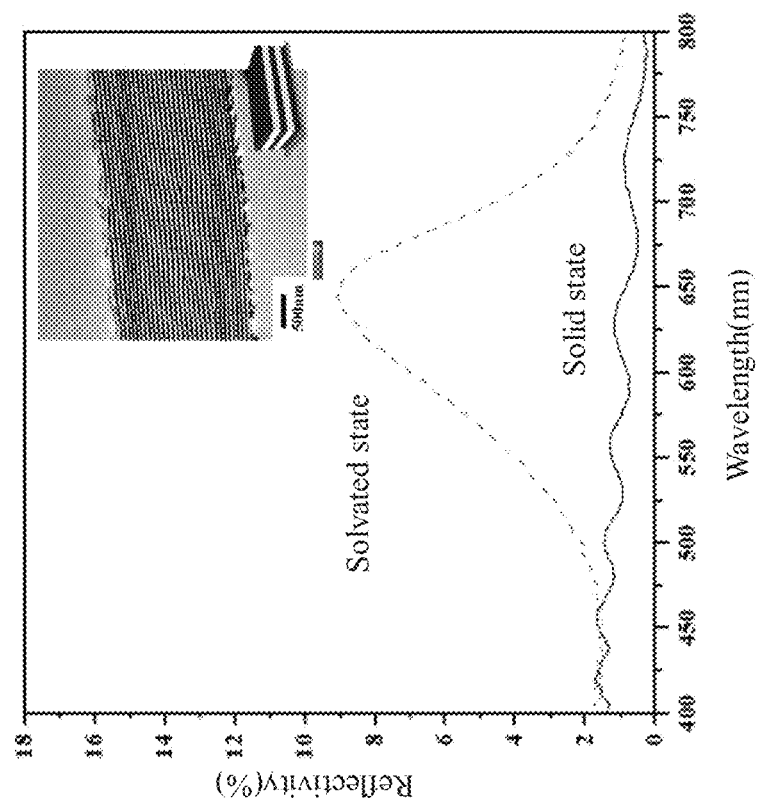
FIG. 7 is a reflectivity spectra of PS-P2VP film having 1D lamellar microstructures.

With reference to FIG. 7, the reflectivity spectra of the 1D lamella-structured PS-P2VP film are shown in the solvated and dried states. The 1D lamellar PS-P2VP film exhibits a red reflectance peak at 646 nm in the solvated state that is similar to the 3D network-structured PS-P2VP in the solvated state. However, when the ethanol is evaporated completely, the lamellar microstructures cannot preserve the structural coloration of the solvated PS-P2VP film such that the lamellar PS-P2VP solvated film rapidly blue shifts to colorless. The disappearance of the visible structural coloration in the 1D lamellar PS-P2VP dried film demonstrates that the TOSC approach of the present invention is strongly dependent on the 3D network structures of the block copolymer film.

According to the equation:

$$x^2 = D \times t$$

where x is the diffusive distance, D is the diffusivity of the polar solvent and t is the time required for evaporation, the time required for complete evaporation of the polar solvent strongly depends on the diffusive distance, diffusivity or evaporation rate of the polar solvent. For instance, the higher evaporation rate of the polar solvent leads to larger shrinkage rate of the PS-PVP copolymer film and smaller periodic dimension of the 3D network structures. Accordingly, the periodicity of the 3D network structures is tunable by adjusting the time required for complete evaporation of the polar solvent without the need to alter the molecular weight of the copolymer, modify functionalities or introduce additives. In the present invention, the single-molecular-weight network-structured PS-PVP block copolymer can be used to fabricate the solid photonic crystal exhibiting different periodicities of the 3D network structures and different structural colorations such that the solid photonic crystal can exhibit full-visible-wavelength structural colorations. Preferably, the periodicity of the 3D network structures in the solid photonic crystal is controlled between 300 nm and 700 nm corresponding to full-visible-wavelength photonic bandgaps by altering the film thickness of the initial photonic crystal film followed with TOSC treatment. And in more details, the evaporation rate of the polar solvent in the solvated film can be altered by adjusting the drying temperature of the solvated film, adjusting the film thickness of the initial film or using distinct polar solvents having different evaporation rates.

With reference to table 1, PS-P2VP initial films having same film thickness by spin-casting from a same PS-P2VP solution are soaked in ethanol for swelling, then the obtained PS-P2VP solvated films are dried at different temperatures for complete evaporation of the ethanol. The higher drying temperature leads to higher evaporation rate and diffusivity of the ethanol, resulting in shorter time required for complete evaporation of the ethanol. Therefore, the PS-P2VP copolymer film can rapidly shrink to trap the structural colorations at shorter wavelengths. Consequently, the structural coloration of the solid 3D network photonic crystal is tunable by adjusting the drying temperature of the solvated film because the wavelength (reflectance peak) of the structural coloration of the PS-P2VP solid photonic crystal is inversely proportional to the drying temperature.

TABLE 1

| Drying Temperature | 10° C. | 25° C. | 30° C. | 40° C. |
|---|---|---|---|---|
| Reflectance Peak | 492 nm | 482 nm | 458 nm | 438 nm |

With reference to table 2, PS-P2VP initial films having different film thicknesses by spin-casting PS-P2VP solutions having different concentrations are first swollen in ethanol and consequently completely dried at room temperature (25° C.) so as to obtain PS-P2VP solid photonic crystals having different thicknesses after TOSC treatment. The final film thickness after TOSC treatment largely relates to the diffusive distance of the ethanol for evaporation such that the thicker PS-P2VP films dry and shrink at a slower rate. For this reason, the thicker network-structured PS-P2VP solid film exhibits structural colorations trapped at longer wavelength because of longer time required for complete evaporation of the ethanol. Consequently, the wavelength (reflectance peak) of the structural coloration of the PS-P2VP solid photonic crystal is directly proportional to the film thickness. This result confirms the structural coloration of the solid 3D network-structured photonic crystal is tunable through altering the thickness of the initial film for ethanol evaporation.

TABLE 2

| Film Thickness | 0.6 μm | 0.8 μm | 1.6 μm | 2.4 μm | 3.2 μm |
|---|---|---|---|---|---|
| Reflectance Peak | 442 nm | 462 nm | 481 nm | 548 nm | 600 nm |

Figure 8:
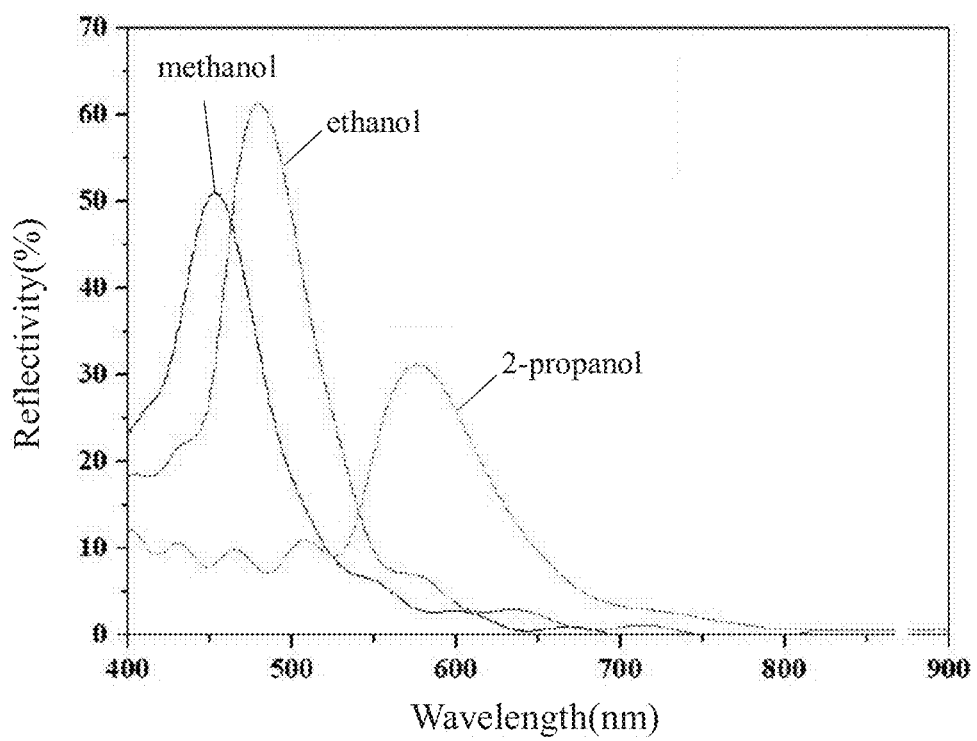
FIG. 8 is a reflectivity spectra of PS-P2VP solid photonic crystal.

With reference to FIG. 8, network-structured PS-P2VP initial films having same film thickness by spin-casting from a same PS-P2VP solution are first swollen in different polar solvents and followed entirely dried at same temperature to completely remove the polar solvents in the solvated PS-P2VP films. In this test, the PS-P2VP initial films are swollen in polar solvents having different vapor pressures, methanol (126 mmHg), ethanol (75 mmHg) and 2-propanol (43 mmHg), respectively. Because the evaporation rate of the methanol is fastest (in other words, the time required for complete evaporation of the methanol is shortest), the methanol-solvated PS-P2VP film dries and shrinks rapidly to form a PS-P2VP solid photonic crystal trapping shortest-wavelength structural coloration. The wavelengths of the structural colorations of the PS-P2VP solid photonic crystals are reversely proportional to the vapor pressures of the polar solvents such that the structural coloration of the solid network-structured photonic crystal is adjustable by using polar solvents having distinct evaporation rates.

The glass transition temperatures of the PS and PVP chains are 102° C. ($T_{g,PS}$) and 92° C. ($T_{g,PVP}$), respectively, so the solid photonic crystal of the present invention exhibits very stable structural coloration at room temperature and even at 70° C. for a long time. As shown in FIG. 3, the PS and PVP chains are softened after heating the solid photonic crystal at a temperature above $T_{g,PS}$ and $T_{g,PVP}$ (e.g., at 110° C.). Meanwhile, the solid photonic crystal with visible structural colorations reverts to the colorless initial film.

Figure 9:
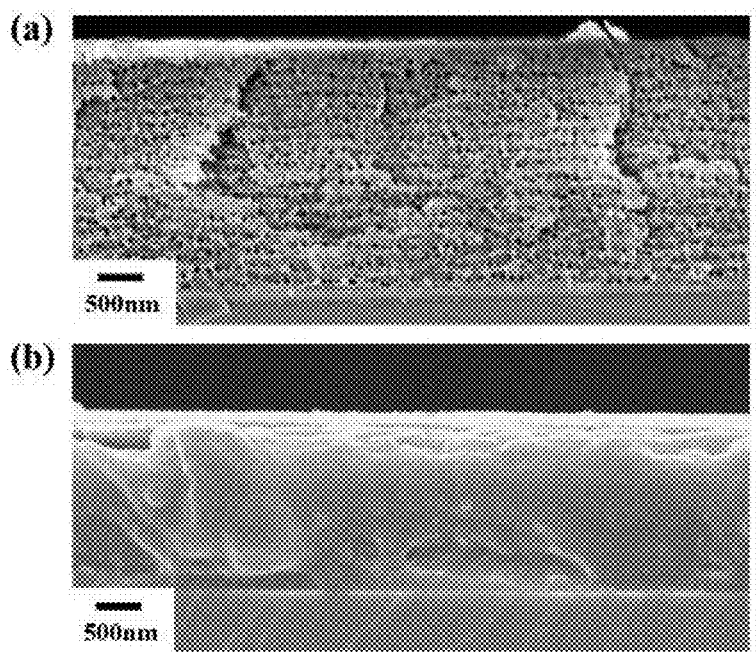
FIG. 9 is a FESEM (field-emission scanning electron microscope) micrograph of PS-P2VP solid photonic crystal before and after thermal treatment.

FIG. 9 is FESEM (filed-emission scanning electron microscope) micrograph of the PS-P2VP solid photonic crystal before (a) and after (b) thermal treatment. As shown in the micrograph before thermal treatment, nanoporous structures generated during the evaporation of the polar solvent can be observed in the PS-P2VP solid photonic crystal. After thermal treatment (heating at 110° C. for 30 seconds), the thickness of the PS-P2VP solid photonic crystal (2.9 μm) decreases back to the initial film (1.6 μm) and the featureless morphology due to the disappearance of the nanoporous structures and visible structural colorations can be observed. As a result, the solid photonic crystal of the present invention displays reversible structural colorations because it can revert to the initial film thickness when heating at a temperature higher than the glass transition temperature.

Figure 10:
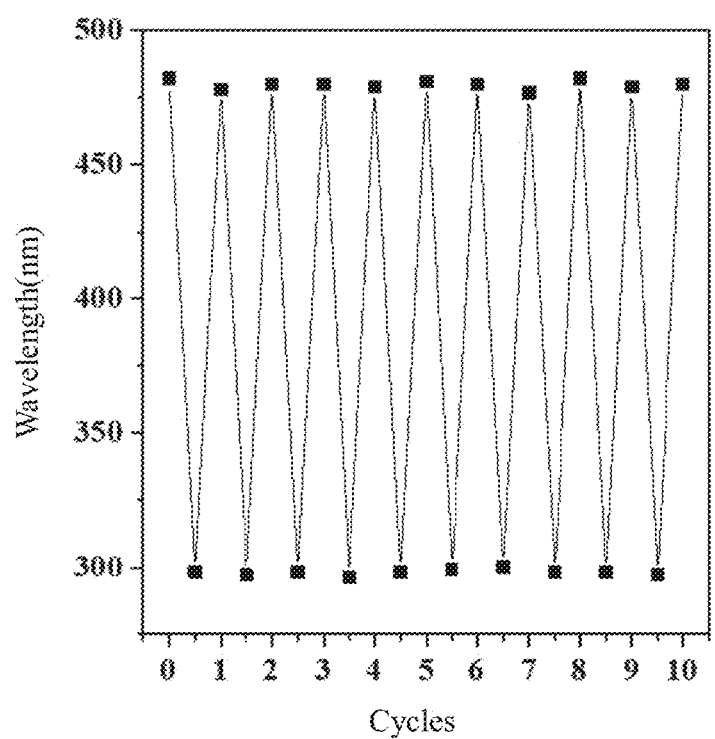
FIG. 10 is a cycle test result of PS-P2VP solid photonic crystal.

With reference to FIG. 10, over 10 cycles of entrapment and reversal of the structural coloration, the reflectance wavelength of the PS-P2VP solid photonic crystal remains unchanged, indicating that the structural coloration is excellent stable and rapidly switchable. Moreover, the solid 3D network photonic crystal film reveals the unchanged structural coloration after the serious bending treatment, indicating that the solid photonic crystal of the present invention exhibits high-strength mechanical properties, high flexibility and stable structural coloration. It is available and promising to be utilized in flexible optical devices.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:
1. A method for fabricating solid photonic crystals comprising:
   preparing a copolymer solution by dissolving a polystyrene-block-polyvinylpyridine (PS-PVP) copolymer in a chloride-containing solvent;

casting the copolymer solution on a substrate to form an initial film, the PS-PVP copolymer self-assembles into 3D periodic network structures having a periodicity corresponding to non-visible wavelengths in the initial film;

swelling the initial film, the initial film is soaked in a polar solvent to swell the PS-PVP copolymer such that the initial film becomes a solvated film, wherein the periodicity of the 3D network structures in the solvated film is higher than that in the initial film; and drying the solvated film, the solvated film becomes a solid photonic crystal when the polar solvent is evaporated completely, wherein PVP blocks in the PS-PVP copolymer become glassy during evaporation of the polar solvent such that the periodicity of the 3D network structures in the solid photonic crystal is preserved between that in the initial film and the solvated film such that the periodicity of the 3D network structures is between 300 nm and 700 nm in the solid photonic crystal.

2. The method in accordance with claim 1, wherein the periodicity of the 3D network structures in the solid photonic crystal is tunable by changing time required for complete evaporation of the polar solvent.

3. The method in accordance with claim 1, wherein the PS-PVP copolymer has a molecular weight lower than 500 kg/mol.

4. The method in accordance with claim 1, wherein the PS-PVP copolymer is polystyrene-block-poly(2-vinylpyridine) or polystyrene-block-poly(4-vinylpyridine).

5. The method in accordance with claim 1, wherein the PS-PVP copolymer has 58-67 vol % of PS blocks.

6. The method in accordance with claim 1, wherein the chloride-containing solvent is chloroform, 1,2-dichloroethane or 1,1,2-trichloroethane.

7. The method in accordance with claim 1, wherein the polar solvent is an alcohol.

8. The method in accordance with claim 1, wherein the polar solvent is methanol, ethanol or 2-propanol.

9. The method in accordance with claim 1, wherein the 3D network structures are gyroid microstructures or interconnected network microstructures.

* * * * *